United States Patent

Rondinelli

[11] Patent Number: 5,575,734
[45] Date of Patent: Nov. 19, 1996

[54] VARIABLE-SPEED DRIVE, PARTICULARLY FOR VEHICLES

[76] Inventor: Antonio Rondinelli, Via B. Spaventa, 20, 10134 Torino, Italy

[21] Appl. No.: 199,278
[22] PCT Filed: Aug. 12, 1992
[86] PCT No.: PCT/IT92/00104
 § 371 Date: Jul. 8, 1994
 § 102(e) Date: Jul. 18, 1994
[87] PCT Pub. No.: WO93/05318
 PCT Pub. Date: Mar. 18, 1993

[30] Foreign Application Priority Data

Sep. 3, 1991 [IT] Italy ................... TO91A0672

[51] Int. Cl.⁶ ............................................. F16H 15/04
[52] U.S. Cl. .................................. 476/55; 476/53
[58] Field of Search ..................... 476/55, 53, 38; 74/348, 349; 475/166, 207, 214

[56] References Cited

U.S. PATENT DOCUMENTS

| Re. 10,968 | 11/1888 | Hoffman | 476/55 |
|---|---|---|---|
| 958,694 | 5/1910 | Cox | 476/55 |
| 2,526,435 | 10/1950 | Teigman | 476/55 |
| 3,257,857 | 6/1966 | Davin et al. | 476/53 |
| 3,910,137 | 10/1975 | Nedeljkovitch | 475/166 |
| 4,841,791 | 6/1989 | Lopez | 476/53 |

FOREIGN PATENT DOCUMENTS

| 589419 | 2/1925 | France | 476/55 |
|---|---|---|---|
| 2131114 | 11/1972 | France | |
| 902204 | 1/1954 | Germany | |
| 1226386 | 10/1966 | Germany | 476/55 |
| 71641 | 11/1948 | Norway | 476/55 |
| 1588948 | 8/1990 | U.S.S.R. | 74/349 |

*Primary Examiner*—Charles A. Marmor
*Assistant Examiner*—Troy E. Grabow
*Attorney, Agent, or Firm*—Ladas & Parry

[57] ABSTRACT

A variable-speed drive (1) having an input shaft (3), at least one output shaft (4), and a system (5) for connecting the input shaft (3) to the output shaft (4) and enabling the velocity ratio of the shafts (3, 4) to be varied continuously; which system is defined by a first truncated-cone-shaped rotary body (6) angularly secured to the output shaft (4) and defined laterally by a curved convex surface (7) having a given radius of curvature and by a number of second truncated-cone-shaped rotary bodies (8) angularly secured to the input shaft (3) and arranged in a ring about the first rotary body (6). Each second rotary body (8) is defined laterally by a curved concave surface (9) having a radius of curvature greater than that of the convex surface (7) defining the first rotary body (6). The rotary bodies (7) are pressed against the first rotary body (6) by a forcing device (43) formed by a pair of helical gears (41, 42), and is controlled by a device (10) for rocking each second rotary body (8) relative to the axis of rotation (14) of the first rotary body (6), so that the curved surfaces (7, 9) mutually engage at a single point of tangency (P).

25 Claims, 6 Drawing Sheets

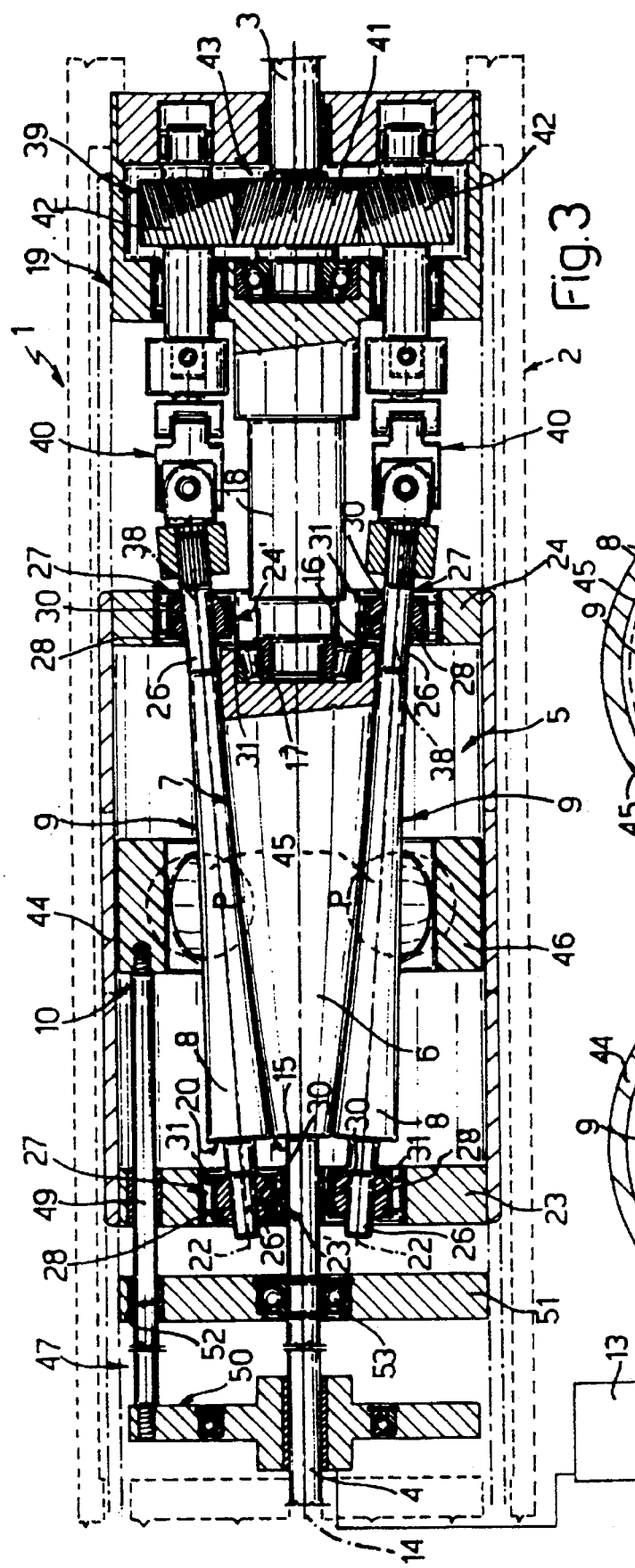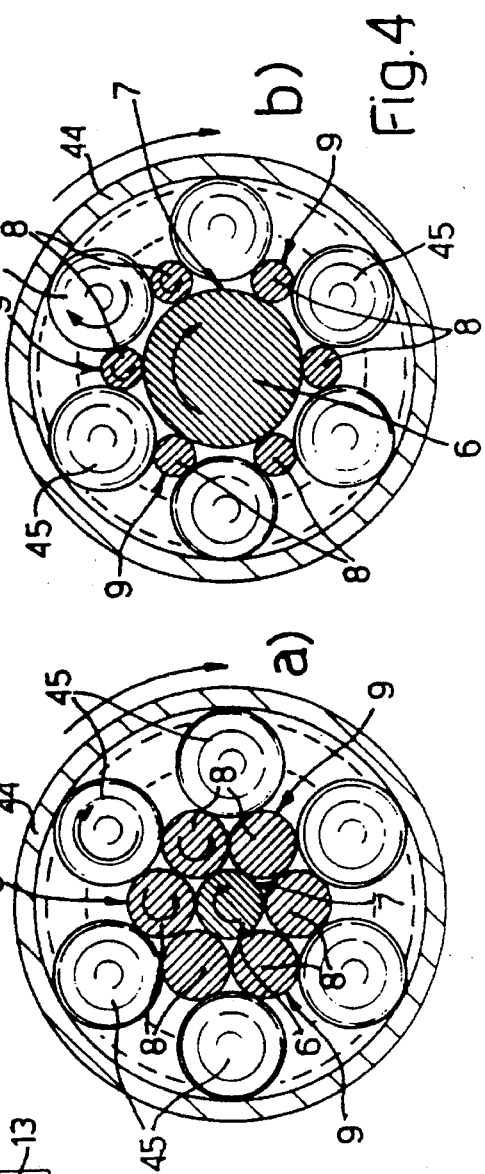

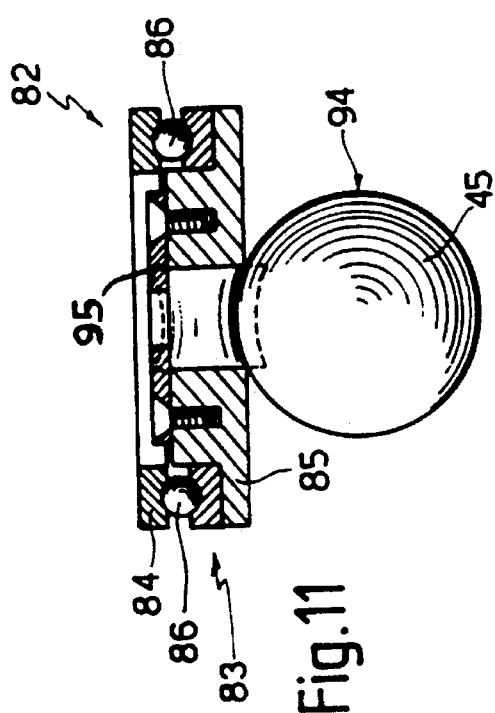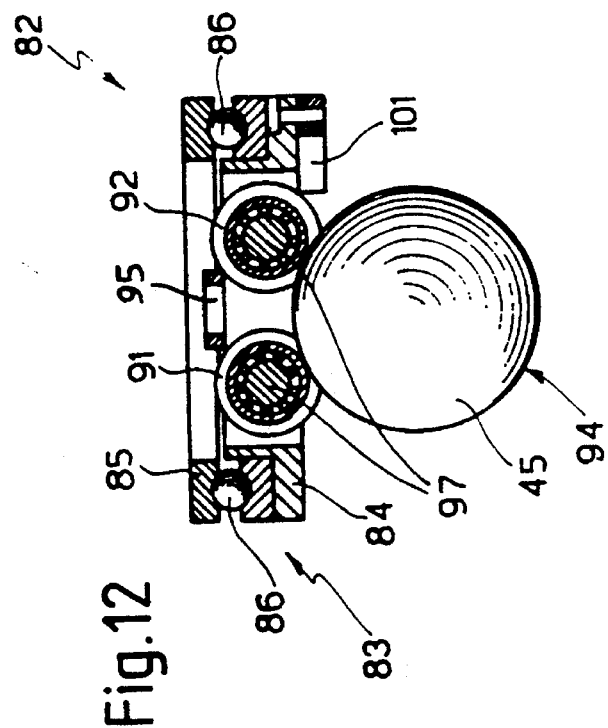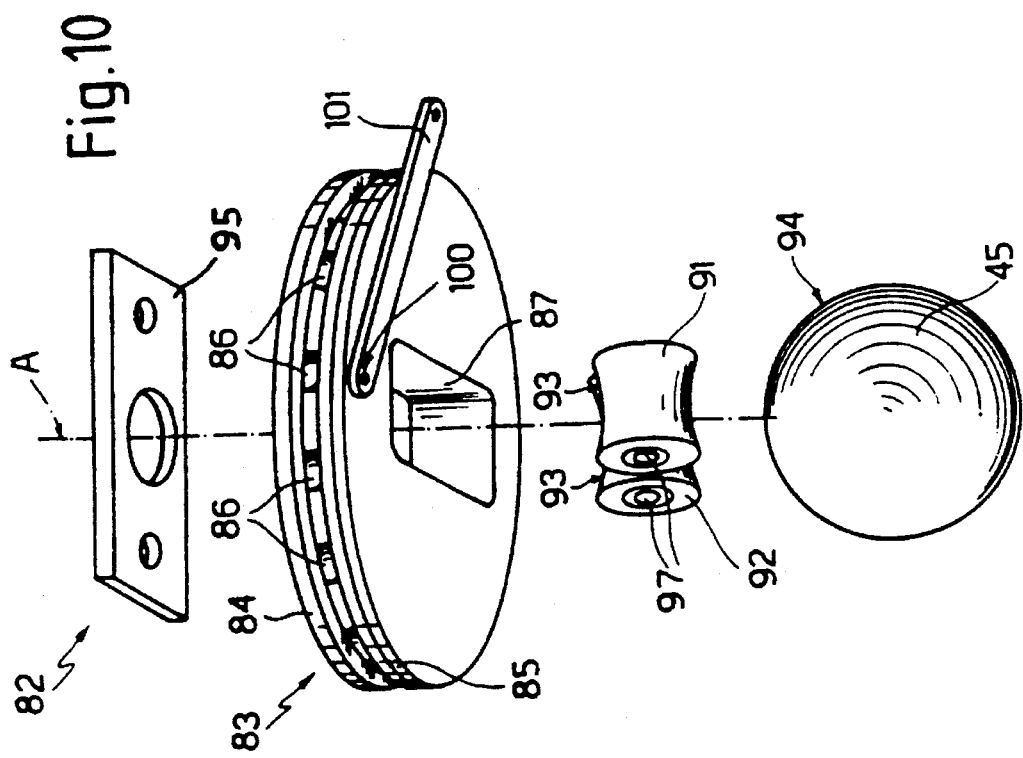

VARIABLE-SPEED DRIVE, PARTICULARLY FOR VEHICLES

TECHNICAL FIELD

The present invention relates to a variable-speed drive, particularly for vehicles.

BACKGROUND ART

Known variable-speed drives normally comprise an input shaft, an output shaft, and a pair of conical bodies, each at least angularly integral with a respective shaft, and connected angularly to each other via the interposition of an intermediate element, the movement of which in relation to the conical bodies provides for varying the velocity ratio of the input and output shafts.

Depending on the application, the intermediate element is defined by a further rigid body, normally a cone or cylinder, or by a flexible element designed to cooperate with a lateral surface of the conical bodies.

In most applications in which a rigid body is used, at least part of the generating line of the body cooperates in sliding manner with part of the generating line of the conical bodies.

Though universally adopted, such a design presents a major functional drawback due to the variation in surface speed along the contacting portions of the generating lines resulting in relative slide between the contacting profiles, thus resulting in increased power loss due to friction and, consequently, in reduced efficiency of the variable-speed drive. Relative slide and, consequently, power loss may be reduced by reducing the length of the contacting portion of the generating line so that, at most, the rotary bodies contact at one point only.

Known design solutions for overcoming the above drawback are nevertheless unsatisfactory in terms of power transmission, which can only be increased by increasing the number of movable intermediate elements, thus resulting in an increase in the size and manufacturing cost of the drive.

The increase in cost is due to the fact that, according to the above solutions, one of the conical bodies must necessarily be axially mobile in relation to the other, thus requiring the use of self-compensating axial joints, i.e. capable of exerting predetermined axial pressure as a function of the torque on the conical drive body.

From DE-A-902 204 it is also known a solution wherein the conical bodies have conjugated curved side surfaces, which are kept in direct contact to each other by forcing means defined by an outer rigid ring axially movable in sliding contact with respect to the conical bodies. Even this solution is however not free from drawbacks, mainly consisting in the fact that the variable speed drive, in order to change the speed ratio between the input and output shafts by moving the ring axially, is to be provided with a friction device able to remove the load from the drive during the change speed operation; in this manner the drive cannot be employed as a continuous one despite the almost infinite speed ratios available.

SUMMARY OF THE INVENTION

It is an object of the present invention to provide a variable-speed drive designed to overcome the aforementioned drawbacks, and which, more specifically, provides for a high degree of mechanical efficiency and relatively high power transmission, while at the same time being straightforward in design and cheap to produce.

According to the present invention, there is provided a variable-speed drive for a vehicle, comprising a rotatable input shaft, at least one rotatable output shaft, and connecting means for connecting said input shaft to said output shaft, and enabling the velocity ratio of the shafts to be varied continuously, said connecting means comprising a first rotary drive element angularly secured to a first of said shafts and defined laterally by a first curved surface having a first radius of curvature, a plurality of second rotary drive elements angularly secured to a second of said shafts and arranged in a ring around said first rotary element, each said second rotary element being defined laterally on a side facing said first rotary element by a respective second curved lateral surface having a second radius of curvature; control means for effecting mutual engagement of said curved surface of said first rotary drive element with the curved surfaces of said second rotary drive elements respectively at a single point of tangency movable along a generating line of said rotary elements; and means for forcing said curved surface of said first rotary element against said second rotary elements at respective ones of said points of tangency, said control means comprising a ring of roller bodies located between said second rotary elements and a reaction element coaxial with said first rotary element; and actuating means for moving said ring of roller bodies axially in relation to said first and second rotary elements; said first and second surfaces which laterally define said first and second rotary elements, being so designed as to maintain said roller bodies gripped between said second rotary elements and said reaction element regardless of the axial position of said roller bodies.

BRIEF DESCRIPTION OF DRAWINGS

A number of non-limiting embodiments of the present invention will be described by way of example with reference to the accompanying drawings, in which:

FIG. 3 shows an enlarged detailed section of the drive in FIGS. 1 and 2 drive;

FIG. 4 shows a cross section of the FIG. 3 drive in two different operating positions;

FIG. 10 shows an enlarged exploded view of a detail on the drive in FIG. 9;

FIG. 11 shows a front section of the embodiment in FIG. 9; and

FIG. 12 shows a front lateral section of the embodiment in FIG. 9 at 90° to the section in FIG. 11.

BEST MODE FOR CARRYING OUT THE INVENTION

Figure 1:
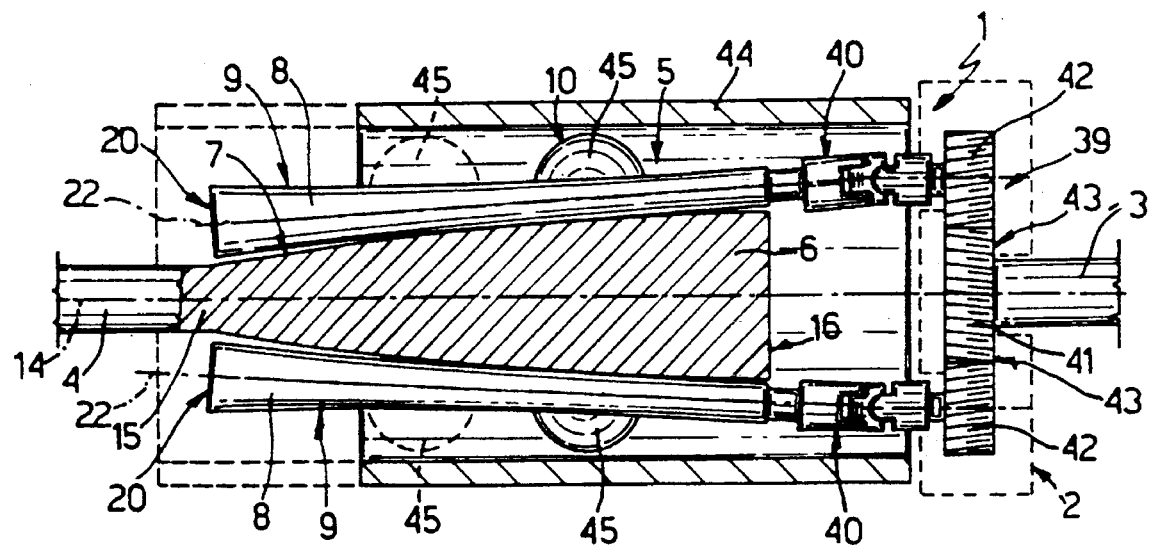
FIG. 1 shows a schematic section, substantially in block form, of a first preferred embodiment of the variable-speed drive according to the present invention.
Figure 2:
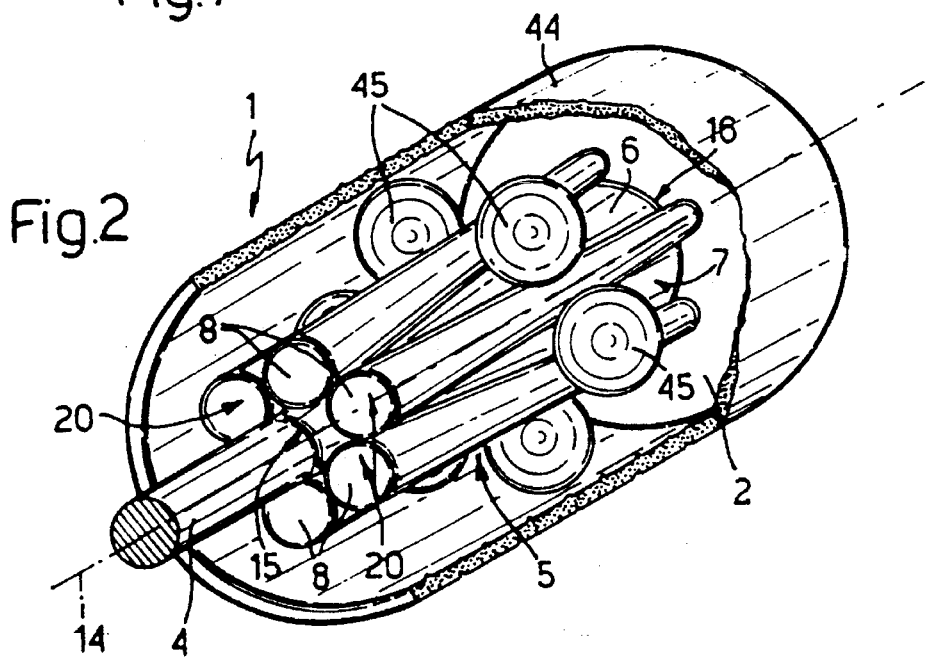
FIG. 2 shows a view in perspective of the drive in FIG. 1.

Number 1 in FIGS. 1 to 3 indicates a variable-speed drive for vehicles, comprising an outer casing 2; an input shaft 3 and output shaft 4 projecting from opposite ends of casing 2; and a system 5 housed inside casing 2, for connecting input shaft 3 to output shaft 4 and enabling the velocity ratio of shafts 3 and 4 to be varied continuously.

As shown in FIGS. 1 to 3, system 5 for connecting shafts 3 and 4 comprises a first truncated-cone-shaped rotary body 6, substantially barrel-shaped and defined laterally by a curved convex surface 7 having a given radius of curvature; and a number (6 in the example shown) of second substantially truncated-cone-shaped rotary bodies 8 arranged in a ring about first body 6. On the side facing first body 6, each second rotary body 8 is defined laterally by a curved concave surface 9 having a given radius of curvature greater than that of convex surface 7 laterally defining first body 6.

System 5 also comprises a control device 10 driven by a control system 13 (FIG. 3), and which provides for mutual cooperation of curved surfaces 7 and 9 at an axially-variable contact point of tangency P.

As shown in FIG. 1 and particularly FIG. 3, first rotary body 6 rotates about axis 14, and presents narrow end 15 connected stably to output shaft 4, and wider end 16 connected, via the interposition of a taper roller bearing 17, to the free end of an elongated cylindrical supporting body 18, the opposite end of which is integral with end portion 19 of outer casing 2.

Second rotary bodies 8 are equally spaced in a ring about first body 6, with wider ends 20 substantially corresponding with narrow end 15 of first body 6, and decreasing in diameter alongside the increasing diameter of first body 6. Second rotary bodies 8 rotate about respective axes 22 diverging by the same angle in relation to axis 14 of first body 6 and towards end portion 19 of casing 2 (FIG. 3). As shown in FIG. 3, second rotary bodies 8 are maintained in the above position by a pair of supporting disks 23 and 24 on either side of first body 6, extending perpendicular to axis 14, and having respective holes 23' and 24' respectively engaged loosely by output shaft 4 and a portion close to the end portion of elongated cylindrical body 18.

Each second body 8 presents end portions 26 connected to supporting disks 23 and 24 by an articulated joint 27 enabling second body 8 to rock relative to axis 14 of first body 6 and about a number of axes (not shown) perpendicular to axis 14.

Figure 6:
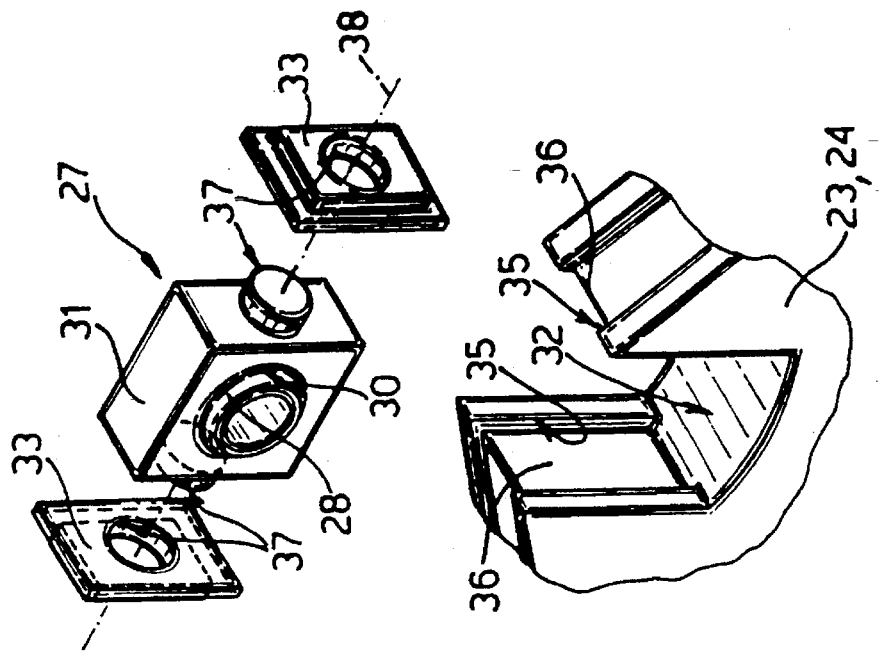
FIG. 6 shows a partial view in perspective of a detail in FIG. 5.
Figure 5:
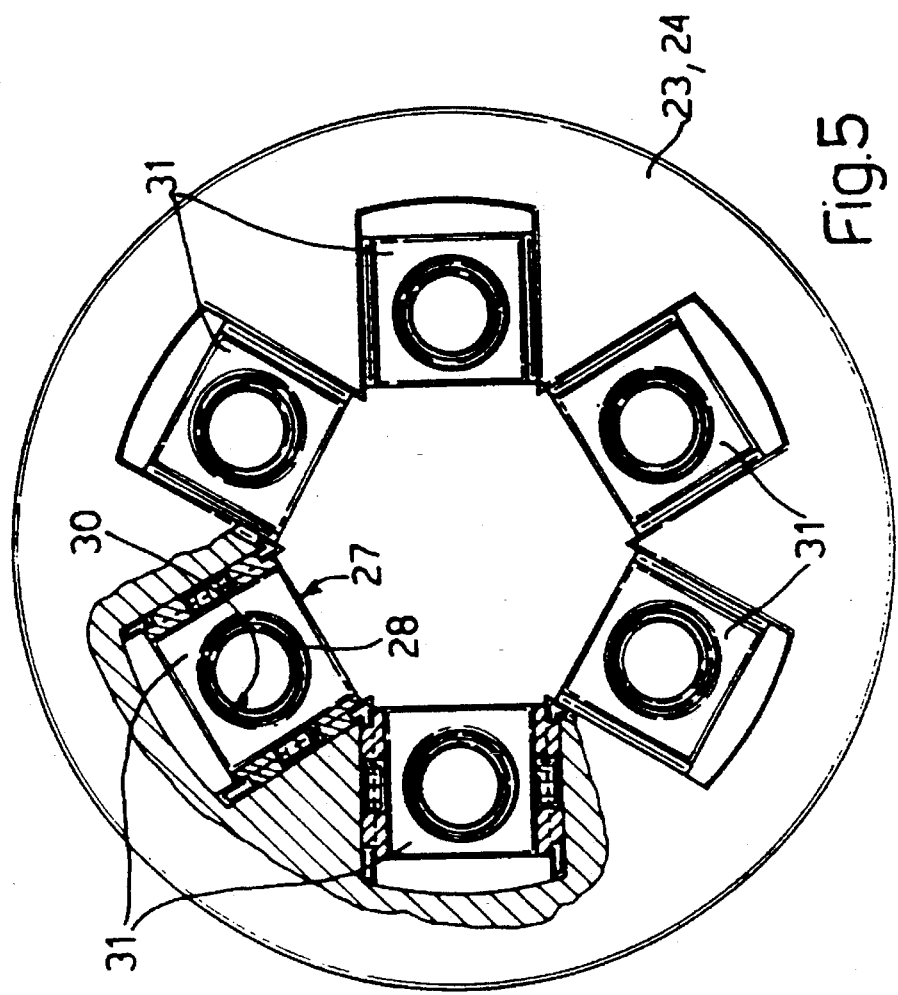
FIG. 5 shows an enlarged view of a detail in FIG. 3.

As shown in FIG. 3 and particularly FIGS. 5 and 6, each articulated joint 27 comprises a first spherical-headed element 28 connected in axially-sliding manner to a respective end portion 26 of second body 8, and engaging a respective spherical seat 30 formed in a second element 31 forming part of articulated joint 27 and secured to supporting disk 23 or 24. Disks 23 and 24 present a number of radial seats 32 (FIG. 6), one for each joint 27, and each engaged by a respective second element 31 of joint 27.

Each second element 31 is in the form of a parallelepipedon (FIG. 6), and is secured to respective supporting disk 23, 24 by a pair of pads 33 (FIG. 6) located on either side of second element 31 and mating with respective guides 35 formed in lateral walls 36 of seat 32, so as to move radially to and from axis 14 of first rotary body 6. Second element 31 also pivots on pads 33 about a pivot 37, so as to rotate about an axis 38 (FIGS. 3 and 6) perpendicular to axis 22 of respective second body 8 and substantially perpendicular to the FIG. 3 plane.

As shown in FIG. 3, variable-speed drive 1 also comprises a helical gear mechanism 39 between input shaft 3 and second rotary bodies 8; and a number of double universal joints 40 between helical gear mechanism 39 and end portion 26 on the narrow end of each second body 8. More specifically, gear mechanism 39 is housed inside end portion 19 of casing 2, and comprises a first helical gear 41 fitted to input shaft 3; and a second helical gear 42 for each second body 8, meshing with and arranged in a ring about helical gear 41, and angularly and axially integral with a respective joint 40. Gear pairs 41 and 42 define a device 43 for forcing second bodies 8 against first body 6. More specifically, the teeth of each gear 41 and 42 are so inclined as to exert a given pull on respective second body 8, via double universal joints 40, and so grip surfaces 7 and 9 together at contact point P, as explained in more detail later on.

As shown in FIG. 3, control device 10 comprises a tubular cylindrical body 44 coaxial with axis 14 of first rotary body 6, housing rotary bodies 6 and 8, and engaged with supporting disks 23 and 24 so as to rotate and translate in relation to the disks. Control device 10 also comprises a ring of roller bodies, more specifically, balls 45 equally spaced inside a retainer 46 and located between second rotary bodies 8 and tubular cylindrical body 44, which acts as a reaction element and defines a race for balls 45. Balls 45 are equal in number to second rotary bodies 8, and the curvature of surfaces 7 and 9 respectively defining first and second rotary bodies 6 and 8 must be such that balls 45 remain contacting second bodies 8 and tubular body 44 regardless of the axial operating position of retainer 46 and, consequently, the location of point P along the generating line of rotary bodies 6 and 8. By virtue of the pull exerted by respective gear pair 41 and 42, each second body 8 is thus forced permanently between first body 6 and balls 45, and in such a manner that the action produced between the contact surfaces of bodies 6 and 8 and perpendicular to the generating lines of the same is sufficient for transmitting the input power to variable-speed drive 1.

Control device 10 also comprises an actuating unit 47 (FIG. 3) for moving retainer 46 and balls 45 in relation to first and second rotary bodies 6 and 8 and so rocking second bodies 8 relative to and from axis 14 of first body 6.

As shown in FIG. 3, actuating unit 47 comprises a number of control rods 49 (only one of which is shown), and an actuator 50 (shown schematically) fitted in axially-sliding manner to output shaft 4 outwards of supporting disk 23, angularly fixed in relation to retainer 46 of balls 45, and controlled in known manner by system 13 so as to move rods 49 parallel to axis 14 of first rotary body 6.

Each rod 49 presents a first end integral with a peripheral portion of actuator 50; and a second end integral with a peripheral portion of retainer 46 between one ball 45 and the next.

A disk 51 for guiding rods 49 is provided between actuator 50 and supporting disk 23. Guide disk 51 presents a number of peripheral axial holes 52 engaged in sliding manner by respective rods 49, and is rotatably engaged in axially-fixed manner to on output shaft 4 via a ball bearing 53.

In use, operation of control system 13 provides movement of actuator 50 axially along output shaft 4 and, consequently, for moving rods 49 in the same direction. This results in axial displacement of retainer 46 and balls 45, thus rocking second bodies 8 relative to axis 14 of first body 6, as permitted by articulated joints 27, and so moving contact point P along the generating lines of first and second bodies 6 and 8.

Axial displacement of balls 45 thus provides for rocking second bodies 8 between two limit positions (FIG. 4) corresponding to the maximum and minimum velocity ratios of variable-speed drive 1. More specifically, when balls 45 are positioned adjacent to supporting disk 23, this provides for the "direct drive" configuration shown in FIG. 4*a*.

Conversely, when balls 45 are positioned adjacent to supporting disk 24, this provides for the FIG. 4*b* configuration corresponding to maximum reduction by the transmission or "first gear" in the case of a discrete transmission.

Displacement of balls 45 also displaces tubular cylindrical body 44, which, together with retainer 46, slides over the outer lateral surface of supporting disk 23 and guide disk 51, when retainer 46 is located adjacent to supporting disk 23, and over the outer lateral surfaces of supporting disk 24 and end portion 19 of casing 2, when retainer 46 is located adjacent to supporting disk 24.

Conversely, when retainer 46 is maintained in a fixed axial position, cylindrical body 44 is rotated by balls 45 about axis 14 of first rotary body 6 and in contact with the relative supporting disk.

Thus, when balls 45 are positioned according to the required velocity ratio, motion is transmitted from input shaft 3 via helical gear mechanism 39 and double universal joints 40 to second rotary bodies 8, which are forced against first rotary body 6 by respective gear pairs 41, 42, and from bodies 8 to output shaft 4 via first body 6, which, by virtue of the pull exerted by gears 41 and 42 on second bodies 8, is gripped between bodies 8.

Figure 7:
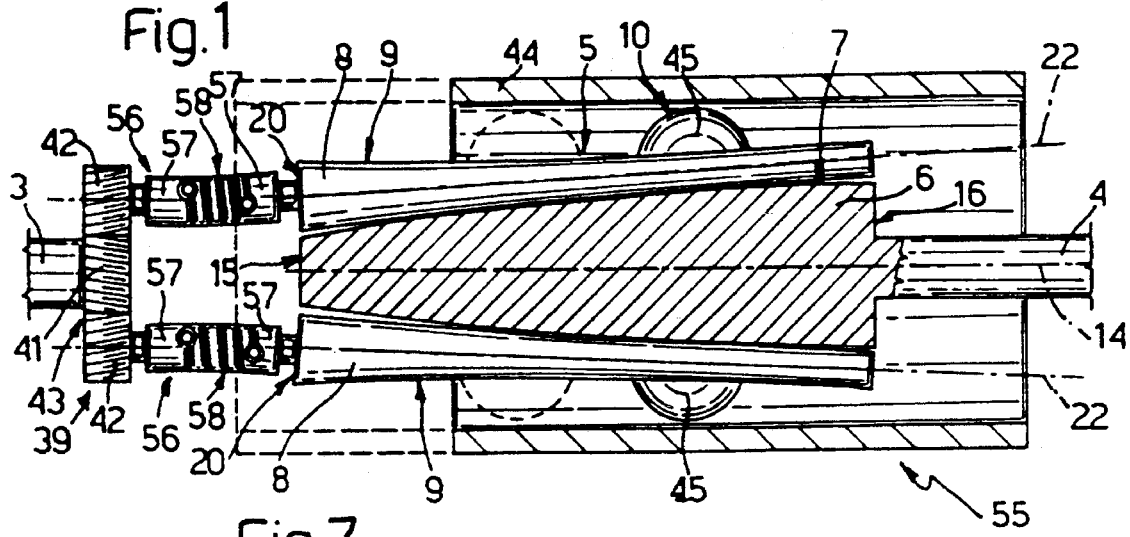
FIG. 7 shows a schematic section, substantially in block form, of a second preferred embodiment of the variable-speed drive according to the present invention.

The FIG. 7 embodiment shows a variable-speed drive 55 similar to drive 1, and the component parts of which are indicated, where possible, using the same numbering system.

In the FIG. 7 embodiment, first rotary body 6 is again integral with output shaft 4, which in this case, however, is connected integral with the wider end 16 of body 6.

Second rotary bodies 8 are again arranged in a ring about first body 6, but, in this case, are connected angularly to input shaft 3 by a respective flexible joint 56, known commercially as a helical joint, located between the wider end 20 of each second body 8 and the respective helical gear 42 of gear mechanism 39. Joint 56 comprises two heads 57, and a flexible body 58 in the form of a coil spring for connecting heads 57. In this case also, the teeth of gears 41 and 42 of mechanism 39 are so inclined as to cause first body 6 to penetrate inside second bodies 8 and so produce a high degree of friction between contacting surfaces 7 and 9.

Figure 8:
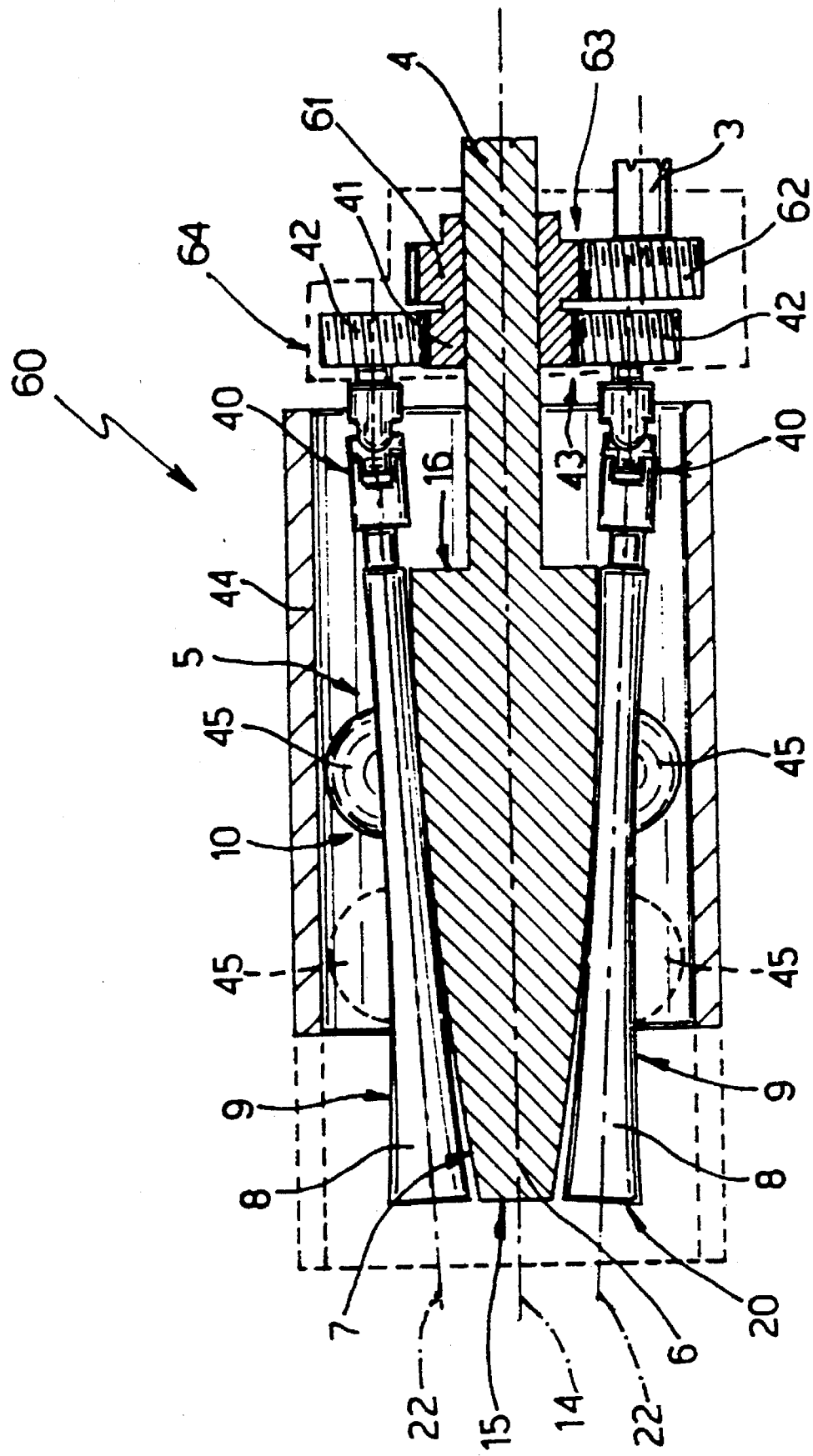
FIG. 8 shows a schematic section, substantially in block form, of a third preferred embodiment of the variable-speed drive according to the present invention.

The FIG. 8 embodiment shows a variable-speed drive 60 similar to drive 1, and the component parts of which are indicated, where possible, using the same numbering system.

Drive 60 differs from 1 in that output shaft 4 extends from the same side as, and parallel and adjacent to, input shaft 3; is connected integral with the wider end 16 of first rotary body 6; and extends between double universal joints 40.

As shown in FIG. 8, gears 42 again mesh with gear 41, which in this case is connected for rotation and in axially-fixed manner to output shaft 4, and is integral with an intermediate gear 61 also rotating in relation to output shaft 4 and in turn meshing with a helical gear 62 fitted to input shaft 3. Gears 41, 42, 61 and 62 define a helical gear mechanism 63 housed inside portion 64 of casing 2, and are secured to portion 64 for exerting said forcing action between rotary bodies 6 and 8.

Figure 9:
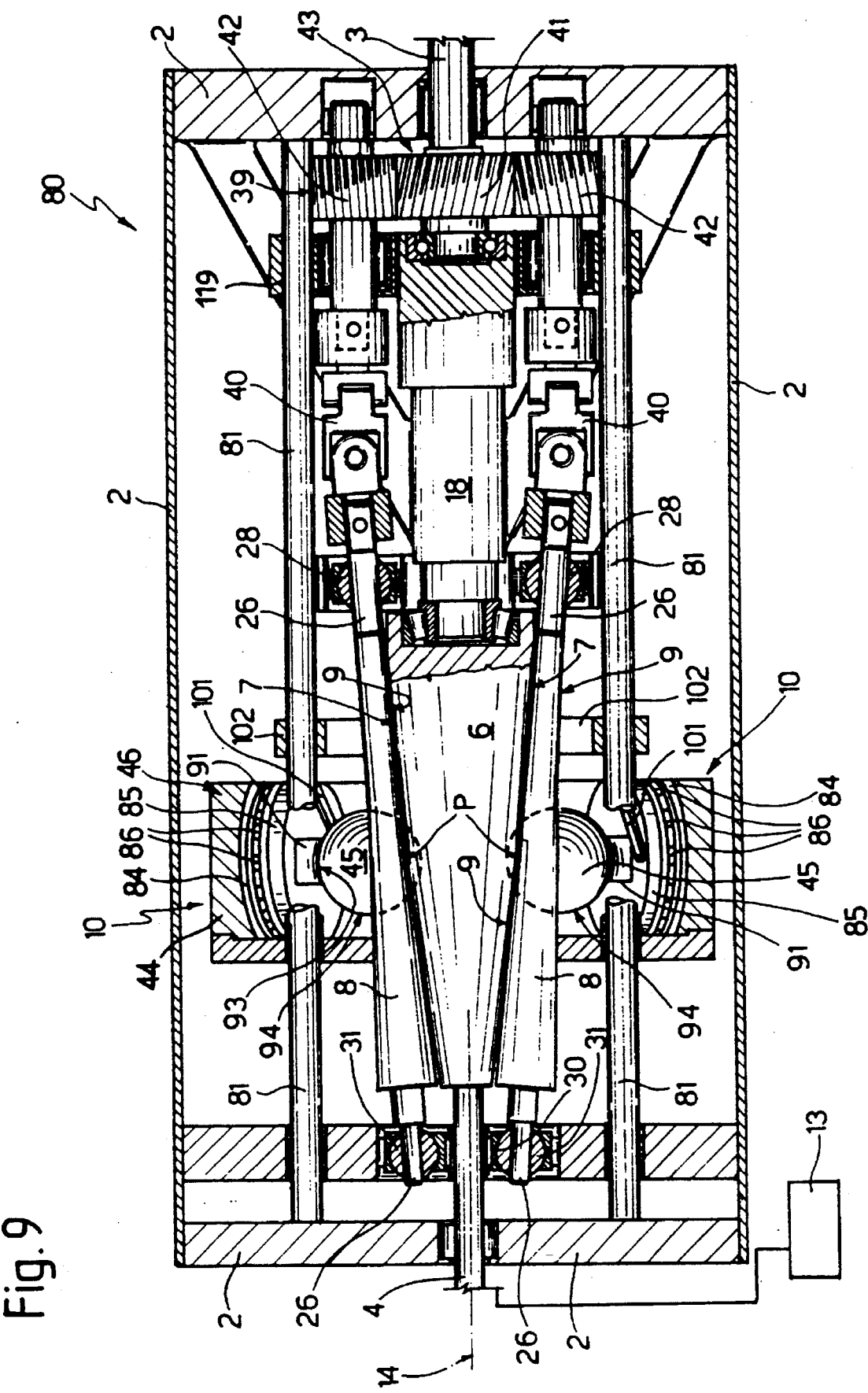
FIG. 9 shows a further preferred embodiment of the variable-speed drive according to the present invention.

The FIG. 9 embodiment shows a variable-speed drive 80 similar to those described above, and the component parts of which are indicated for the sake of simplicity using the same numbering system.

As shown in FIGS. 9 to 12, drive 80 differs from 1 as regards the design of control device 10, which in this case comprises a ring of roller bodies, more specifically balls 45, equally spaced inside a retainer defined by an annular cup-shaped element 46, which performs the function of both retainer 46 and, as will be seen, contact element 44 on drive 1.

Control device 10 is mounted, through the end wall, so as to slide along a number of supporting and guide bars 81 integral with casing 2 and arranged in a ring, parallel to axis 14 of output shaft 4, inside the radial gaps between balls 45.

Between each ball 45 and cylindrical lateral wall 44 of retainer 46, there is provided a rolling element 82 for absorbing all the rolling components which would otherwise be transmitted by balls 45 to retainer 46 and, more specifically, to lateral wall 44 radially outwards of balls 45.

As shown in FIGS. 10, 11 and 12, each rolling element 82 comprises an axial thrust bearing 83, the axis A of which is substantially perpendicular to axis 14 of output shaft 4; and a pair of saddle rollers 91, 92.

Axial bearing 83 consists of a first cylindrical thrust bearing 84, and a second cylindrical thrust bearing 85 coaxial with the first, and between which is provided a number of spherical rolling bodies 86.

Thrust bearings 84 and 85 present a central through seat 87 for housing idle rollers 91 and 92 mounted on respective parallel rolling bearings 97. Rollers 91 and 92 present respective concave outer surfaces 93 cooperating in rolling manner with outer surface 94 of each ball 45, which thus fits between rollers 91, 92 of respective element 82 and the two adjacent second bodies 8 on either side of ball 45.

Bearing 83 also presents a plate 95, screwed on to thrust bearing 85, for retaining rollers 91 and 92 inside seat 87 during operation, on the opposite side to ball 45.

Second thrust bearing 85 is fitted to a first end 100 of a control tie 101 for moving control device 10 along bars 81, and so moving the point of action of balls 45 along outer surface 9 of rotary bodies 8, and, consequently, contact point P between bodies 8 and outer surface 7 of first body 6.

The second opposite end (not shown) of tie 101 is fitted to a drive ring 102 (substituting actuator 50 on drive 1) also mounted in sliding manner on bars 81 and controlled by a known system (not shown) connected, in the example shown, to control system 13.

In use, balls 45 are gripped between respective pairs of bodies 8 (FIG. 4) and lateral wall 44 of retainer 46, via the interposition of a respective element 82 between each ball 45 and wall 44. Thrust bearings 84 thus rest on wall 44, which, via bearings 84 and rollers 91, 92 on bearing 83, acts as a contact element for balls 45 in the same way as element 44 on drive 1. In this case, however, wall 44, and consequently retainer 46 as a whole, is not rotated by balls 45, by virtue of the fact that the rolling movement of balls 45 is absorbed by rollers 91, 92 and bearing 83; and axial displacement of element 82 by tie 101 is also transmitted to retainer 46, thus varying the velocity ratio as already described. It is to be understood that in this embodiment as well as the previously described embodiments, the balls 45 are angularly stationary around the axis 14 of shift 4 by being gripped between rotating bodies 8 and wall 44.

The advantages of variable-speed drives 1, 55, 60 and 80 will be clear from the foregoing description. In particular, they provide for direct contact of rotary bodies 6 and 8 and, more specifically, at a single point of tangency P, thus drastically reducing, if not totally eliminating, power loss due to friction, and so improving the efficiency of the drive and enabling a maximum velocity ratio of roughly 1:6.

At the same time, the design characteristics of the drive provide for relatively high power transmission for a given size, which is extremely compact even for high power transmission values.

The size, in particular the length, of the drive is further reduced in the case of drive 80 as shown in the FIG. 9 embodiment. In fact, whereas on drive 1, for example, displacement of retainer 46 is also accompanied by displacement of reaction element 44, which, being rotated by balls 45, must be supported and therefore long enough to rest on either one of supporting disks 23, 24, thus resulting in a relatively long drive 1, wall 44 of drive 80 forms part of retainer 46, and, by virtue of being prevented from rotating by elements 82, may be supported on the same bars 81 supporting retainer 46, thus enabling a considerable reduction in the length of wall 44.

In addition to transmitting motion between input shaft 3 and second rotary bodies 8, helical gear mechanism 39 on variable-speed drives 1 and 55 obviously also performs the function of a self-compensating axial joint, that is, capable of exerting predetermined axial pressure on second rotary bodies 8 as a function of input power.

To those skilled in the art it will be clear that changes may be made to variable-speed drives 1, 55, 60 and 80 as described and illustrated herein without, however, departing from the scope of the present invention. In particular, a different type of articulated joint may be used for connecting ends 26 of second rotary bodies 8 to respective supporting disks 23 and 24.

Joints 40 and 56 may be replaced by others designed, for example, to support second bodies 8 in the operating position, in which case, supporting disks 23 and 24 on drives 1, 55 and 60 may be dispensed with.

At least part of the action for forcing second bodies 8 against first body 6 may be performed by flexible joints 56, which, depending on assembly and as a function of torque, may provide for exerting pull or thrust for achieving said forcing action.

Finally, changes may be made to the manner in which second bodies 8 are forced into contact with first body 6. In particular, gears 41 and 42 may provide for exerting only part of the forcing action, the remainder being provided for by balls 45, which may be force fitted between second bodies 8 and cylindrical body 44. Moreover, said forcing action may be partly achieved by providing systems enabling axial displacement of first body 6 in relation to second bodies 8.

In this case, and not only this, supporting body 18 (FIG. 9) may be made integral with casing 2 by means of a system enabling bars 81 (or similar) to extend beyond the axial position of gears 42 (e.g. by means of radial ribs), and end portion 19 may be replaced by a ring 119 mounted so as to slide axially along guide bars 81 and body 18, and, like end 19, supporting gears 42 while at the same time securing bodies 8 so that they all move axially together and by the same amount in relation to body 6. In this way, points P are located permanently on the same circumference, regardless of the position of balls 45, thus preventing one or more of bodies 8 from sliding in relation to body 6 and so resulting in premature wear of the device.

A different type of actuating unit 47 may be provided for displacing balls 45; and contact element 44 need not necessarily be a tubular body as described herein.

Finally, depending on requirements, variable-speed drives 1, 55, 60 and 80 may obviously be so designed as to enable the use of a control motor (not shown) in the high efficiency range, thus improving the "elasticity" of the motor itself.

What is claimed is:

1. A variable-speed drive for a vehicle, comprising a rotatable input shaft, a rotatable output shaft, and connecting means for connecting said input shaft to said output shaft in driving engagement and enabling the velocity ratio of the shafts to be varied continuously, said connecting means comprising:

a first rotary drive element angularly secured to a first of said shafts and having a first, curved, lateral surface with a first radius of curvature;

a plurality of second rotary drive elements angularly secured to a second of said shafts and arranged in a ring about said first rotary element, each said second rotary element having a respective second, curved, lateral surface facing said first rotary element with a second radius of curvature;

control means providing for mutual cooperation of said first curved surface of said first rotary member respectively with said second curved surfaces of said second rotary elements at a single point of tangency which is movable along a generating line of said rotary elements; and means for forcing said curved surfaces against each other at each said point of tangency, said control means comprising:
      a reaction element coaxially arranged with said first rotary element;
      a ring of a plurality of roller bodies located between said second rotary elements and said reaction element; and
      actuating means for axially moving said ring of roller bodies in relation to said first and second rotary elements;
      said first and second curved surfaces of said first and second rotary elements being constructed and arranged to maintain said roller bodies gripped between said second rotary elements and said reaction element regardless of axial position of said roller bodies.

2. A variable-speed drive as claimed in claim 1, wherein each said second curved surface has a greater radius of curvature than said first surface, said first and second surfaces having opposite curvatures.

3. A variable-speed drive as claimed in claim 1, wherein said first rotary element is a barrel-shaped taper roller angularly secured to said output shaft; and said second rotary elements are taper rollers, each angularly secured to said input shaft and having a decreasing diameter alongside an increasing diameter of said rotary element.

4. A variable-speed drive as claimed in claim 1, wherein said roller bodies are equal in number to said second rotary element.

5. A variable-speed drive as claimed in claim 1, wherein said second rotary elements have respective end portions secured to a pair of supporting disks on either side of said first and second rotary elements; and each said end portion being connected to said respective supporting disk by articulated means enabling said respective second rotary element to rock with respect to the axis of said first rotary element.

6. A variable-speed drive as claimed in claim 5, wherein said articulated means comprises a spherical articulated joint in turn comprising a first spherical-headed element connected in sliding manner to an end portion of a respective said second rotary element and engaging a respective spherical seat formed in a second element secured to a respective said supporting disk; said second element being secured to said respective supporting disk via a pair of pads located on either side of said second element and connected to said supporting disk so as to slide radially relative to the axis of said first rotary element; said second element also pivoting on each said pad so as to rotate about an axis perpendicular to the axis of said first rotary element.

7. A variable-speed drive as claimed in claim 5, comprises an actuator mounted in axially-sliding manner on the shaft angularly secured to said first rotary element; and at least one rod between said actuator and said ring of roller bodies; said rod being connected in axially-sliding manner to a guide disk located between said actuator and said first and second rotary elements, and in turn connected to the shaft angularly secured to said first rotary element via the interposition of a rolling bearing.

8. A variable-speed drive as claimed in claim 7, wherein said means for forcing said curved surfaces against each other is located between said second rotary elements and the shaft to which said second rotary elements are angularly secured; said means for forcing said curved surfaces against each other further comprising, for each said second rotary element, a pair of helical gears meshing with each other and the teeth of which are so inclined as to exert a given force substantially along the axis of said respective second rotary elements and to force said first and second surfaces into contact with each other.

9. A variable-speed drive as claimed in claim 8, provides for forcing said respective second rotary elements between said first rotary elements and said control means.

10. A variable-speed drive as claimed in claim 8, wherein each said pair of gears comprises a first helical gear angularly secured to a second rotary element, and a second helical gear fitted on the shaft angularly secured to said second rotary elements; said first and second helical gears defining a helical gear mechanism housed inside a portion of an outer casing.

11. A variable-speed drive as claimed in claim 8, wherein said input shaft and said output shaft are parallel and located on the same side in relation to said first and second rotary elements; and each said pair of gears comprises a first helical gear angularly secured to a second rotary element, and a second helical gear fitted in rotary and axially-fixed manner to the shaft angularly secured to said first rotary element, and secured to an intermediate gear in turn meshing with a helical gear fitted to said shaft angularly secured to said second rotary elements; the latter said helical gears, said first and second gears and said intermediate gear defining a helical gear mechanism housed inside a portion of an outer casing.

12. A variable-speed drive as claimed in claim 10, which further comprises an angle joint between each said second rotary element and said first helical gear.

13. A variable-speed drive as claimed in claim 12, wherein said angle joint is a double universal joint.

14. A variable-speed drive as claimed in claim 12, wherein said angle joint is a flexible joint defined by a pair of heads connected by an elastic element in the form of a coil spring.

15. A variable-speed drive as claimed in claim 12, wherein each said angle joint is located between said first helical gear and the smaller end of said respective second rotary element.

16. A variable-speed drive as claimed in claim 12, wherein each said angle joint is located between said first helical gear and the larger end of said respective second rotary element.

17. A variable-speed drive as claimed in claim 12, wherein said portion of said outer casing comprises an elongated body extending towards the end of said first rotary element opposite the end thereof secured to said first shaft, said elongated body extending between said angle joints, and inside a hole formed in the supporting disk adjacent to said angle joints; said first rotary element having a free end connected to a free end of said elongated body via the interposition of a taper roller bearing; said shaft secured to said first rotary element extending through the other of said supporting disks adjacent to said guide disk of said rods and through said guide disk.

18. A variable-speed drive as claimed in claim 5, wherein said reaction element comprises a tubular body extending outwards of said actuating means and at least defining a race of said roller bodies.

19. A variable-speed drive as claimed in claim 18, wherein said reaction element extends outwards of and is engageable in rotary and axially-sliding manner with said supporting disks.

20. A variable-speed drive as claimed in claim 1, wherein said control means further comprises rolling elements, each of said rolling elements being provided between each said roller body and said reaction element, for absorbing rolling components transmitted by said roller bodies to said reaction element.

21. A variable-speed drive as claimed in claim 20, wherein each said rolling element comprises an axial bearing having an axis substantially perpendicular to the axis of said output shaft; said axial bearing having a through seat for housing respective idle rollers; said idle rollers having respective concave outer surfaces cooperating with the outer surface of each said roller body.

22. A variable-speed drive as claimed in claim 21, wherein said axial bearing is fitted to a first end of a control tie for moving said control means and so moving said point of tangency between said second rotary elements and said curved surface of said first rotary element.

23. A variable-speed drive as claimed in claim 1, wherein said second rotary elements are secured axially to one another.

24. A variable-speed device as claimed in claim 1, wherein said ring of roller bodies comprises a ring of balls.

25. A variable-speed device as claimed in claim 24, wherein said balls are rotatable about respective centers thereof and are angularly secured around an axis of rotation of said second of the shafts by being gripped between said second rotary bodies and said reaction element.

* * * * *